Figure 1:
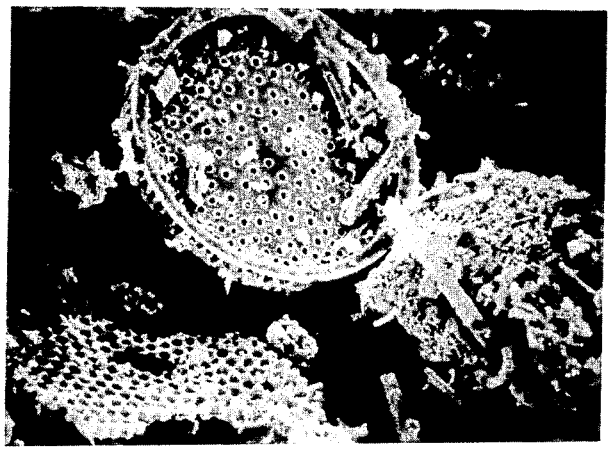
Figure 2:

United States Patent [19]

Klimmek et al.

[11] Patent Number: 4,666,635
[45] Date of Patent: May 19, 1987

[54] NICKEL-BASED CATALYST, ITS PREPARATION AND ITS APPLICATION

[75] Inventors: Helmut Klimmek, Emmerich; Günter Klauenberg, Kleve-Materborn, both of Fed. Rep. of Germany

[73] Assignee: Internationale Octrooi Maatschappij "Octropa" B.V., Rotterdam, Netherlands

[21] Appl. No.: 698,581

[22] Filed: Feb. 1, 1985

Related U.S. Application Data

[62] Division of Ser. No. 568,261, Jan. 4, 1984.

[30] Foreign Application Priority Data

Jan. 20, 1983 [NL] Netherlands .................. 8300218

[51] Int. Cl.$^4$ .................................. C11C 3/00
[52] U.S. Cl. ........................ 260/409; 260/690
[58] Field of Search ........................... 260/409, 690

[56] References Cited

U.S. PATENT DOCUMENTS

| | | | |
|---|---|---|---|
| 2,602,070 | 7/1952 | Kirkpatrick | 502/337 |
| 2,776,245 | 1/1957 | Sowerwine | 502/259 |
| 3,649,563 | 3/1972 | Holscher | 502/259 |
| 3,652,458 | 3/1972 | Gobron et al. | 502/259 |
| 3,673,115 | 6/1972 | Linsen et al. | 502/259 |
| 3,697,445 | 10/1972 | Carter | 502/259 |
| 3,759,843 | 9/1973 | Holscher et al. | 252/459 |
| 3,868,332 | 2/1975 | Carter et al. | 502/259 |
| 3,959,181 | 5/1976 | Boerma | 502/258 |
| 3,997,475 | 12/1976 | Rijnten et al. | 502/259 |
| 4,014,519 | 3/1977 | Tebben et al. | 502/259 |
| 4,014,818 | 3/1977 | Tebben | 502/258 |
| 4,114,982 | 1/1979 | Schroeder et al. | 502/259 |
| 4,142,962 | 3/1979 | Yates et al. | 502/259 |
| 4,163,750 | 8/1979 | Bird et al. | 502/259 |
| 4,191,664 | 3/1980 | McArthur | 502/259 |
| 4,251,344 | 2/1981 | Carter et al. | 502/234 |
| 4,273,680 | 6/1981 | Halvin et al. | 502/259 |
| 4,317,748 | 3/1982 | Torek et al. | 502/337 |

FOREIGN PATENT DOCUMENTS

| | | |
|---|---|---|
| 0712568 | 6/1965 | Canada . |
| 0926235 | 5/1963 | United Kingdom . |
| 1209242 | 10/1970 | United Kingdom . |
| 1367088 | 9/1974 | United Kingdom . |
| 1400719 | 7/1975 | United Kingdom . |
| 2006266 | 7/1981 | United Kingdom . |
| 2066690 | 7/1981 | United Kingdom . |

OTHER PUBLICATIONS

Beckmann, H. J., *Practical Hydrogenation,—A.O.C.S. World Conference on Oilseed and Edible Oil Processing*, 1982, pp. 1–12.

Riesz et al, *The Journal of the American Oil Chemists' Society*, 8/64, vol. 41, No. 7, pp. 464–468.

*Primary Examiner*—Charles F. Warren
*Assistant Examiner*—Elizabeth A. Flaherty
*Attorney, Agent, or Firm*—Cushman, Darby & Cushman

[57] ABSTRACT

A process for the catalytic hydrogenation of an unsaturated compound using a nickel-silica catalyst. The catalyst comprises aggregates which have an average particle size ranging from 2 to 100 micrometers and said aggregates have outer surface which is at least 60% free of carrier particles.

1 Claim, 2 Drawing Figures

Scanning electron micrograph of catalyst.
Magnification 1000 x, green cake with Kieselguhr.

Electron micrograph Guhr catalyst
loo r.p.m. magnification 5oo x
(lmm≃2um)

NICKEL-BASED CATALYST, ITS PREPARATION AND ITS APPLICATION

This is a division of application Ser. No. 568,261, filed Jan. 4, 1984.

The invention relates to a nickel-based catalyst, to its preparation and to its application for hydrogenation reactions.

Nickel-based catalysts are well-known and are widely used as hydrogenation catalysts. It is customary to prepare them by pecipitating nickel-hydroxide and/or -carbonate from an aqueous solution of a nickel salt using an alkaline reactant, often in the presence of a carrier.

In the preparation of these catalysts measures are often taken to precipitate the insoluble nickel compounds as gradually as possible from the solution onto the carrier particles suspended therein. To this end, for example, a carrier suspension in a solution of a nickel-ammonia complex is heated so as to allow the ammonia to escape, thereby causing the nickel to precipitate (cf. GB-A-No. 926 235). Alternatively, urea is incorporated in the solution in which the carrier is suspended, after which the urea is decomposed by heating (cf. GB-A-No. 1 220 105), causing the nickel hydroxide to precipitate. The aim of this very gradual precipitation of the nickel is to cover the carrier particles entirely or largely with nickel compound. Furthermore, GB-A-No. 1 367 088 discloses the preparation of a catalyst by precipitating nickel on guhr, keeping temperature, pH, alkalinity and residence time within narrow ranges. In this process the nickel hydroxide is slowly precipitated from a diluted solution in a reaction vessel, after which the solid components are separated. Precipitation and post-reaction (the latter normally being referred to as "ageing") take place in the same reaction vessel, which therefore has to be relatively big, under the same reaction conditions.

It has now been found however that new, improved nickel-based catalysts can be prepared by carrying out this process in at least two separate steps, to wit: (i) A very rapid precipitation step, in which under vigorous agitation the nickel hydroxide/carbonate is precipitated in a precipitation reactor with a mean residence time of 0.01 to 10, preferably 0.2 to 4.5 minutes, rather even less than 3.5 minutes, during which the normality of the solution in the reactor, containing excess alkali, is between 0.05 and 0.5, preferably between 0.1 and 0.3N and the temperature of the liquid in the precipitation reactor is kept between 5° and 95°, preferably between 20° and 55° C. (ii) At least one separate, longer ageing step with a mean residence time in the post-reactor of 20 to 180 min, and a temperature that remains between 60° and 100°, preferably between 90° and 98° C. It is sometimes preferred for the temperature during the ageing step(s) to differ from that during the precipitation step; in particular it may be advantageous to perform the ageing step at somewhat higher temperatures, e.g. with a difference of 10° C. above the precipitation temperature.

The nickel-based catalysts according to the present invention comprise a water-insoluble carrier material which is present or added during preparation. Suitable carrier materials are, for example, silica-containing materials such as kieselguhr, aluminium trioxide, and silicates such as bentonite. Kieselguhr is the preferred material, particularly kieselguhr containing from 50 to 90 wt.% of amorphous silica.

The carrier material can be added (a) directly as such, (b) as an aqueous suspension, (c) preferably as a suspension in an aqueous nickel salt solution, (d) as a suspension in an aqueous solution of the alkaline compound.

According to embodiments (a)-(d) the carrier can be added before or during precipitation. According to embodiments (a), (b) or (d), however, the carrier can also be added entirely or partly (the latter being preferred) after precipitation, but also before or during ageing.

After precipitation and ageing according to the invention the solids are separated from the liquid, optionally washed, dried and activated by contacting them with hydrogen at an elevated temperature in a manner known per se.

Nickel compounds which can be used as starting materials for the preparation of the catalysts according to the present invention are water-soluble nickel compounds such as nitrate, sulphate, acetate and chloride. The solutions that are fed into the precipitation reactor preferably contain between 10 and 80 g nickel per liter; particularly preferred is the use of solutions containing between 25 and 60 g nickel per liter.

Alkaline compounds which can be used as starting material in the process according to the present invention are alkalimetal hydroxides, alkalimetal carbonate, alkalimetal bicarbonate, the corresponding ammonium compounds and mixtures of the above-mentioned compounds. The concentration of the alkaline solution fed into the precipitation reactor is preferably 20–300 g of anhydrous material per liter (as far as the solubility permits this), particularly between 50 and 250 g per liter.

It has practical advantages to use the two solutions (nickel-containing and alkaline, respectively) in about equal concentrations expressed in equivalents, resulting in the use of about equal volumes.

The nickel-containing solution and the alkaline solution are fed at such rates that a slight excess of alkaline compound is present during the precipitation step, namely such that the normality of the liquid ranges from 0.05 to 0.5, preferably from 0.1 to 0.3 (said normality being determined by titration with aqueous hydrochloric acid using methylorange as the indicator). In the ageing step it may sometimes be desirable to add further alkaline solution in order to maintain the alkalinity (normality) in the above-defined range.

The precipitation reactor comprises a means for vigorous agitation of the reacting fluid and its dimensions are such in relation to the amounts of fluid fed that the short mean residence times indicated can be obtained. Preferred mean residence times in the precipitation reactor are normally between 0.01 and 10, particularly between 0.2 and 4.5 minutes. The precipitation step and also the ageing step can be carried out batchwise, continuously and semi-continuously (e.g. according to the cascade method).

In the preferred continuous precipitation process (step i) the rate of addition of the solutions to the precipitation reactor is controlled by continuously or discontinuously measuring the alkalinity (normality) of the discharged liquid. This can sometimes also be done by monitoring the pH. Also the temperatures of the reacting liquids fed into the precipitation reactor are used to control the temperature at which precipitation takes place. The required vigorous agitation of the liquid in the precipitation reactor preferably takes place with an energy input of 5–25K watts per 1000 kg of solution. Jet mixing is also a suitable method, involving much larger specific energy inputs of up to 2000K watts/kg.

The reaction mixture obtained from the precipitation reactor is subsequently led into a significantly larger post-reactor, in which the liquid is further agitated. If desired, additional ingredients can be incorporated here, such as carrier material, alkaline solution as defined hereinbefore and/or possibly promoters.

Preferably the temperature of the liquid in the post-reactor, i.e. during the ageing step, is kept at a temperature between 60° and 100° C., preferably between 90° and 98° C.

The normality of the liquid in the post-reactor during the ageing step (step ii) is kept in the same range as during the precipitation step (step i); it may be required to add some further alkali. The ageing step can be performed in one or more post-reactors, the (overall) mean residence time being kept between 20 and 180 min, preferably between 60 and 150 min. If two or more post-reactors are used it is desirable to arrange this in such a way tht in the second or following post-reactor the temperature of the liquid is 10 to 15 centrigrades below the temperature in the first post-reactor.

After completion of the ageing step the solids are separated from the mother liquor, usually washed, dried, optionally ground and/or calcinated and subsequently activated with hydrogen gas at an elevated temperature usually ranging between 250° and 500°, preferably between 300° and 400° C. This activation can take place at atmospheric or higher pressure. Atmospheric pressure is preferred.

Preferably before drying, or during any previous step promoters can conveniently be added. Promoters comprise amounts of 0.05 to 10%, calculated on the weight of nickel, of metals/compounds such as copper, cobalt, zirconium, molybdenum, silver, magnesium, any other metals and combinations thereof.

The separated solid is preferably washed with water, sometimes made slightly alkaline, or water with a detergent added thereto.

Organic solvents can sometimes be used advantageously. Drying takes place preferably with forced air circulation. Spray-drying and freeze-drying are also quite well possible.

The present invention provides new, improved nickel-based catalysts which comprise 10–90 parts by weight of nickel/nickel compounds and 90–10 parts by weight of insoluble carrier material, as well as 0–10, preferably 0.05–5 parts by weight of a metal promoter, which catalysts have an active nickel surface of 70–200 m$^2$/g, preferably more than 100 m$^2$/g, said catalysts further comprising aggregates which mainly consist of nickel/nickel compounds with an average particle size of 2 to 100 micrometers, preferably between 5 and 25 micrometers, and which aggregates have an (outer) surface which is for at least 60% free of carrier particles attached thereto. Preferably the nickel/nickel compound aggregates have a surface which is for more than 80%, particularly for more than 90% free of carrier particles.

The nickel/nickel compound aggregates consist mainly, i.e. for more than 80%, preferably more than 90%, of nickel and nickel oxides, but some promoter material may also be present. These aggregates preferably contain nickel crystallites with an average diameter between 0.5 and 10, more particularly between 1 and 3 nanometers.

The catalyst according to the invention is used for the hydrogenation of unsaturated organic compounds, in particular oils and fats, fatty acid and derivatives thereof.

The invention is illustrated by the following Examples.

EXAMPLE 1

An aqueous suspension was prepared by suspending kieselguhr (containing 7.0% amorphous $SiO_2$) in a $NiSO_4$ solution (35 g Ni/l and 1.2N), in such a way that the Ni:$SiO_2$-ratio was 1:2.3. Also an aqueous soda solution, containing 75 g of $Na_2CO_3$ (anh) per liter and 1.4N, was prepared. Subsequently both solutions were continuously pumped into a vigorously agitated pump reactor, in about equal volumes, resulting in precipitation of nickelhydroxide/carbonate at a temperature of 80° C. The alkalinity of the suspension so obtained was 0.096N. In the reactor in which the precipitation took place the suspension had a residence time of 4 minutes, after which the suspension was immediately passed to the first of a series of two post-reactors. In each of these post-reactors the precipitate was aged for 50 minutes (mean residence time) at temperatures of 97° and 80° C., respectively. The aged precipitate was then continuously filtered off and the green filter cake thus obtained was washed with water, dried and activated with hydrogen under atmospheric pressure at a temperature of 350° C.

Electron microscopy and microröntgen analysis showed that the catalyst consisted of nickel crystallites averaging 2 nanometers and aggregates averaging 21 micrometers. The surface of the nickel/nickel compound aggregates was for about 85% free of carrier particles and also the original shape of the siliceous skeletons was largely uncovered and well and freely perceptible.

EXAMPLES 2–7

Following the procedure as described in Example 1 further catalysts were prepared according to the invention, while varying the amounts and conditions, as is shown in Table I. Measures were taken to keep the other conditions unchanged.

In Table II, showing the hydrogenation characteristics of this catalyst, comparisons are made with a catalyst known from the literature.

On fatty acid hydrogenation it was found that for achieving a certain iodine value, with catalysts according to the invention less than half the hydrogenation time was sufficient and that in the case of fish oil the catalyst also retained its activity for a longer period. From the melting points it appeared that the new catalyst had a greater selectivity, i.e. less tri-saturated triglyceride was formed.

On fatty acid hydrogenation it turned out that hydrogenation could be carried through to lower iodine values in the same hydrogenation time and thus proceeded more rapidly than with the known catalyst used for comparison. Furthermore, the hydrogenations can also be performed with excellent results at a lower hydrogenation temperature. In addition, the new catalyst could be filtered very effectively, in any case better than the known catalyst.

Table III below gives an impression of fatty acid hydrogenation plotted against time (relation between iodine value and hydrogenation time under otherwise equal conditions).

TABLE III

| Hydrogenation time (min) | Iodine value with catalyst 4 (Table II) | Iodine value with known catalyst (Table II) |
|---|---|---|
| 30 | 45.1 | 72.1 |
| 60 | 15.3 | 45.5 |
| 90 | 9.8 | 22.2 |
| 120 | 5.3 | 17.8 |
| 150 | 3.3 | 15.1 |

Table III demonstrates that the iodine value of the hydrogenated fatty acid of about 15.2, obtained with the conventional catalyst widely used for this purpose after about 150 minutes, was already reached in about 60 minutes with the catalyst according to the invention, which is a considerable technological improvement.

TABLE I

| | Example: | | | | | | |
|---|---|---|---|---|---|---|---|
| | 1 | 2 | 3 | 4 | 5 | 6 | 7 |
| Ni:SiO$_2$ ratio | 2.3 | 2.3 | 2.3 | 2.3 | 2.3 | 1.8 | 1.8 |
| Precipitation | | | | | | | |
| Conc. soda solution, mol/l | 0.7 | 0.7 | 0.7 | 0.7 | 0.7 | 0.7 | 1.0 |
| Conc. nickel solution, mol/l | 0.6 | 0.6 | 0.6 | 0.6 | 0.6 | 0.6 | 0.6 |
| Precipitation temp. (°C.) | 80 | 20 | 30 | 55 | 50 | 85 | 22 |
| Mean resid. time (step 1), min | 4 | 1 | 1 | 1 | 1 | 0.3 | 0.5 |
| Excess alkali (normality) | 0.10 | 0.19 | 0.21 | 0.22 | 0.21 | 0.13 | 0.21 |
| Ageing of precipitate | | | | | | | |
| Number of post-reactors | 2 | 2 | 1 | 2 | 2 | 1 | 1 |
| Temperature (°C.) | 97/80 | 97/80 | 96 | 93/80 | 90/77 | 95 | 97 |
| Mean resid. time (step 2) in minutes | 50/50 | 50/50 | 50 | 50/50 | 85/50 | 30 | 30 |
| Excess alkali (mol/l) | 0.135/ 0.192* | — | — | — | — | — | — |

* = extra alkali
Catalysts 1–5 contained 70% nickel and 30% SiO$_2$(; catalysts 6 and 7 ) (contained 64% nickel and 36% SiO$_2$.
nickel surfaces ranged between 120 and 150 m$^2$/g nickel.
Nickel aggregates were found to range between 9 and 26 micrometers and the catalyst of Example 4 was shown to have nickel aggregates which proved to be for 85% free of carrier particles.

TABLE II

| Example | Example | | | | | | | Compara. example |
|---|---|---|---|---|---|---|---|---|
| | 1 | 2 | 3 | 4 | 5 | 6 | 7 | |
| Ni % in reduced catalyst | 52.4 | 51.8 | 52.6 | 53.0 | 52.7 | 51.2 | 52.0 | 22 (in fat susp.) |
| Oil hydrogen test refined marine oil of I.V. 165 to 85; conditions: 250 g oil, 0,1% Ni on oil, 60 LH$_2$/h press. 1 bar, max. temp. 180° C., 750 rpm, reduct. temp. of cat. 350° C. | | | | | | | | |
| Hydrogen. time (min) | 92 | 85 | 83 | 92 | 85 | 90 | 103 | 127 |
| m.p. of oil (°C.) | 32 | 32.5 | 32 | 32.5 | 32.5 | 33 | 32.5 | 36 |
| fatty acid hydrog. test 300 g tallow fatty acid (olein fraction) 0,07 Ni on fatty acid, H$_2$ press. 30 bar max. temp. 180° C. Stirring speed 850 rpm hydrog. time 150 min reduction cat. 350° C. I.V after hydr. | 3.1 | 2.5 | 3.2 | 3.3 | 2.6 | 3.4 | 3.0 | 15.1 |

EXAMPLE 8

A 10% aqueous soda solution and a 3.5% aqueous nickel sulphate (calculated as nickel) solution in which kieselguhr (22 g per liter) had been blended were both continuously pumped into a small precipitation reactor (75 ml capacity) whilst the reactor was heavily agitated (energy input 6 Watts per liter of solution). The two liquids were fed into the reactor in such rates that the pH in the precipitation reactor was 9.3. The residence time was 0.5 minutes.

After precipitation the slurry contained about 4% of solids and this slurry was continuously aged in a relatively larger vessel (capacity 4.5 l) with moderate stirring. The ageing temperature was 97° C. and the pH was 8.9. The average residence time in the ageing reactor was about 30 minutes.

After 1.5 hours the flows were stopped and 4.5 l of slurry were filtered in a Büchner funnel under vacuum. After filtration the solids (filter cake) were washed with 4 liters of distilled water. The filter cake was then dried overnight in an oven at 120° C.

Samples of the green filter cake were investigated by electron microscopy (magnification 500 and 1000×). The photos showed small nickel/nickel compound aggregates of which 80% were free of carrier particles and also the original shapes of the siliceous skeletons were largely uncovered by nickel/nickel compounds and freely perceptible.

The green cakes were reduced at 400° C. with a hydrogen flow of 15 nm$^3$/kg Ni for 30 minutes.

The active nickel surface area was determined by hydrogen chemisorption and yielded a value of 110 m$^2$/g nickel. The average size of the nickel crystallites was calculated to be 3 nanometers and the size of the nickel/nickel compound aggregates was found to be 30 micrometers.

This catalyst had excellent properties for the hydrogenation of soybean and fish oils.

We claim:

1. In a process for the catalytic hydrogenation of an unsaturated compound, which comprises using, as the catalyst, a catalyst which consists essentially of 10-90 parts by weight of nickel and 90-10 parts by weight of silica and having an overall active nickel surface of 70-200 m$^2$/g, per gram nickel, characterized in that the catalyst comprises aggregates which have an average particle size ranging from 2 to 100 micrometers and wherein the aggregates have an outer surface which is at least 60% free of carrier particles.

* * * * *